United States Patent [19]

Jonnes

[11] 4,032,681
[45] June 28, 1977

[54] POROUS REFLECTIVE FABRIC

[75] Inventor: Nelson Jonnes, Stillwater, Minn.

[73] Assignee: Minnesota Mining and Manufacturing Company, St. Paul, Minn.

[22] Filed: Apr. 21, 1975

[21] Appl. No.: 569,795

[52] U.S. Cl. .................................. 428/253; 2/81; 156/212; 156/229; 427/162; 427/250; 427/404; 428/263; 428/285; 428/457; 428/914; 428/920
[51] Int. Cl.² .................................. B32B 7/00
[58] Field of Search ............. 427/162, 250, 404; 428/253, 263, 285, 297, 317, 343, 344, 209, 354, 457, 918, 920, 921, 914; 156/309, 212, 229; 264/210, 291; 2/7, 8, 81, 82, 243 A

[56] References Cited

UNITED STATES PATENTS

| 2,413,970 | 1/1947 | Hawley | 428/263 |
| 2,703,772 | 3/1955 | Keithly | 428/285 |
| 2,912,345 | 11/1959 | Weiss | 428/263 |
| 3,034,940 | 5/1962 | Collins et al. | 428/253 |
| 3,413,180 | 11/1968 | Smith | 428/285 |
| 3,824,197 | 7/1974 | Smith et al. | 260/2.5 R |

Primary Examiner—James J. Bell
Attorney, Agent, or Firm—Cruzan Alexander; Donald M. Sell; Roger R. Tamte

[57] ABSTRACT

A new reflective fabric comprising a base fabric covered with a thin originally continuous reflective layer that has been extensively fractured. The fractures provide porosity but leave the fabric with a high reflectivity.

14 Claims, 6 Drawing Figures

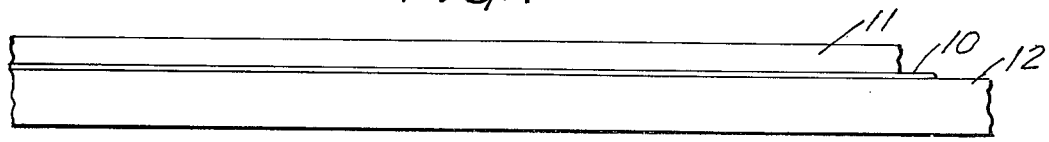
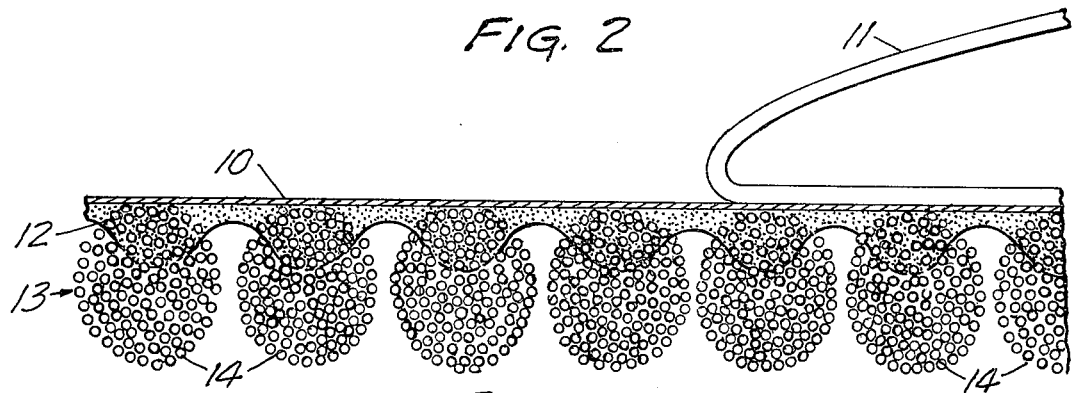
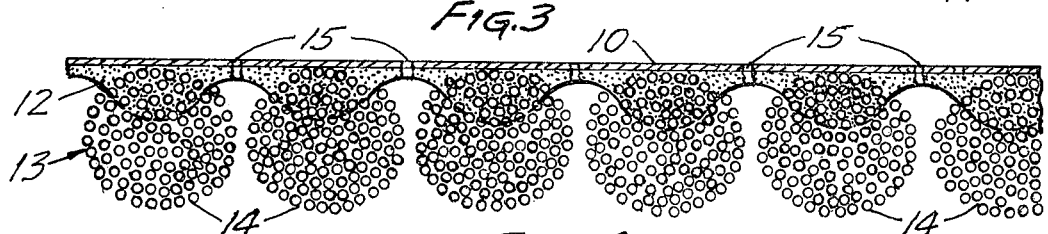
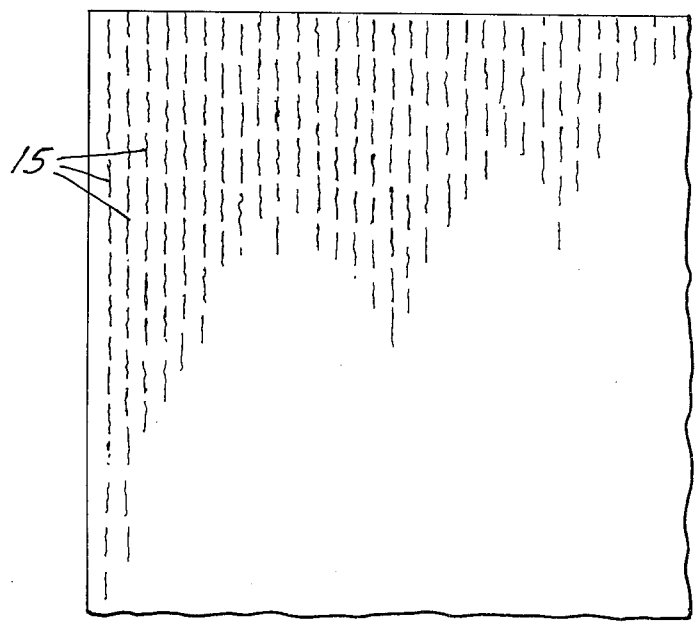

POROUS REFLECTIVE FABRIC

INTRODUCTION

The present invention provides a new porous or "breathable" reflective fabric, which is useful in clothing to provide relief from heat stress, particularly in environments subject to a source of radiation that is hotter than the ambient air temperature. Representative environments of this type include boiler rooms, furnace rooms, steel mills, foundries, and glass factories, which may have globe temperatures of 105° F and higher, as well as outdoor environments experiencing strong direct sunlight.

Heat-reflective fabrics have been marketed for many years. One of the most successful at minimizing the effects of intense radiation, which is taught in Keithly, U.S. Pat. No. 2,703,772, carries a smooth, continuous, vapor-deposited, exterior metal film. An important deficiency of this product is that the impermeability of both the metal film and the adhesive layer that adheres the film to a base fabric limits evaporation of body moisture and convection of air, and these factors also influence the comfort of a wearer. Garments made from such fabrics will allow persons such as firefighters to approach closely to a source of intense heat for short periods of time; but they become quite uncomfortable when worn for longer periods of time.

Rand, U.S. Pat. No. 2,630,620 teaches a different kind of heat-reflective fabric, formed by spraying a coating composition that comprises metal flakes dispersed in a binder material onto a base fabric. The patent recognizes a need for porosity and seeks to control the spraying operation so as to leave the interstices of the fabric uncovered. Whatever porosity is achieved by this approach, however, metal flakes covered with binder material do not provide a very high degree of heat reflection. Further, the irregularity produced by applying metal flakes onto an irregular fabric surface reduces heat-reflectivity even more. So far as known, fabric as taught in the Rand patent has never achieved significant commercial success, probably because of its ineffective reflectivity.

Schramm, U.S. Pat. No. 2,748,019, recognizes the undesirability of covering metal flakes with binder material, and instead teaches a two-step method in which binder material is first applied onto fabric, and metal flakes then applied to the binder layer. So far as known, such fabrics have also not achieved commercial success, and the irregularity of the applied metal would appear to reduce heat-reflectivity of the layer.

Palmquist et al, U.S. Pat. No. 3,591,400 teaches a heat-reflective fabric having a durable continuous reflective layer made from overlapping metal flakes. While having good reflectivity and durability, it also has the disadvantage of being impermeable, so as to be best used only for short periods of time.

Many other prior-art metallized fabrics are designed at least principally for a use other than in clothing. One commercial product of which I am aware, sold primarily for use as a liner for mattresses, comprises an open-mesh cloth to which a preformed metal foil has been laminated under sufficient pressure to form scattered ruptures in the foil. However, the fabric has only a low porosity and hardly any draping qualities, and is not suited for extended wearing in an environment of heat stress.

In summary, while the need for combining porosity with reflectivity has previously been recognized in the prior art, no satisfying answer to this need has been found. The present invention answers that need, and in so doing greatly extends the potential uses of reflective fabrics.

SUMMARY OF THE INVENTION

Briefly, a reflective fabric of the invention comprises a base fabric and a thin originally continuous smooth reflective layer adhered to the base fabric by a layer of adhesive material. Both the reflective and adhesive layers have an extensive network of minute fractures in them which communicate with interstices in the base fabric. The result is that the fabric has a porosity sufficient for extended comfortable wearing of a garment made from the fabric. Despite the fractures, reflectivity of the fabric remains good: the fractures do not seriously disrupt the original continuity and mirror-like nature of the reflective layer. The complete reflective fabric has substantially the same drapability as the base fabric, and is eminently suited for use in a garment.

A process for preparing such a breathable, heat-reflective fabric comprises steps as follows:

1. depositing a thin continuous smooth reflective layer onto a smooth flexible web;
2. applying a layer of adhesive material onto said reflective layer;
3. laminating a base fabric to the adhesive layer;
4. removing the smooth flexible web from the reflective layer; and
5. stretching the resulting sheet material so as to form the network of minute fractures in the reflective and adhesive layers at interstices of the fabric.

DESCRIPTION OF THE DRAWINGS

FIGS. 1–3 illustrate steps in a representative process for making porous reflective fabric of the invention: FIG. 1 is an enlarged edge view of a portion of sheet material used as a component in fabric of the invention; FIG. 2 is an enlarged sectional view through a portion of fabric of the invention at an intermediate stage of manufacture; and FIG. 3 is an enlarged sectional view through a portion of a completed fabric of the invention;

FIG. 4 is a top view showing completed fabric of the invention;

DETAILED DESCRIPTION

Figure 5:
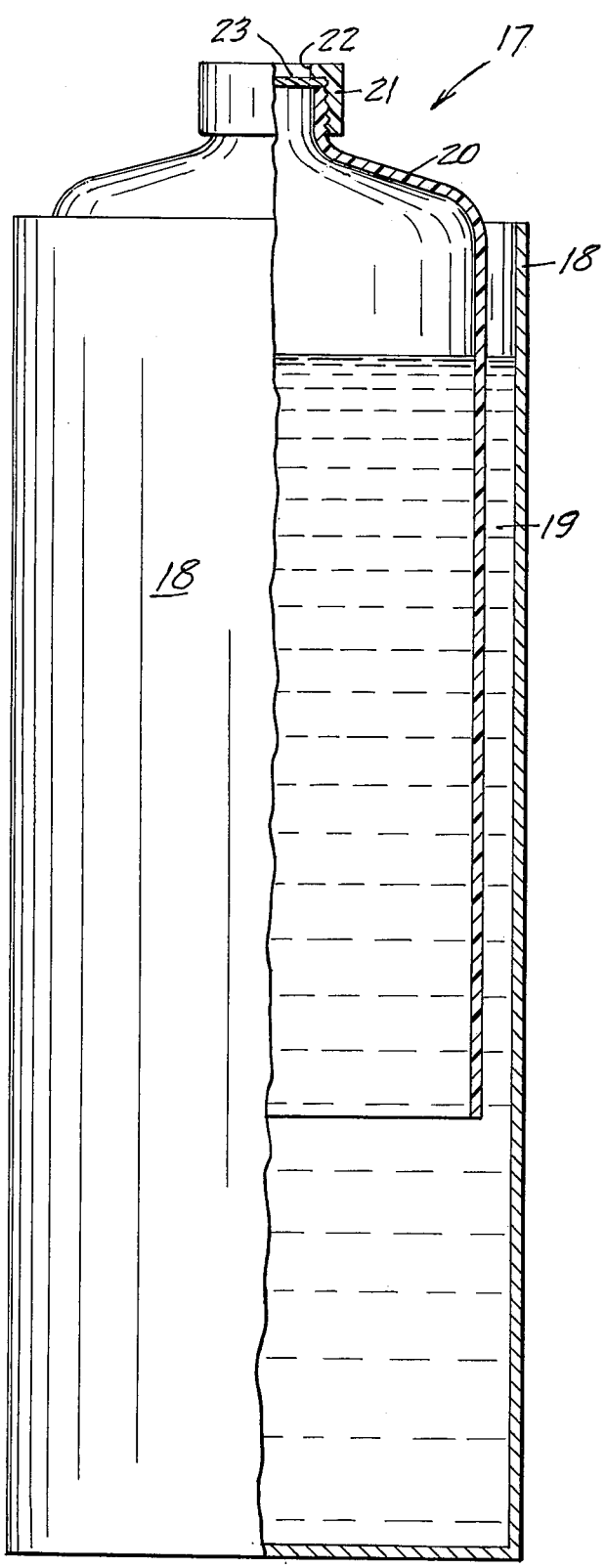
FIG. 5 is a cross-sectional view of apparatus for measuring fabric porosity.

FIGS. 1–3 illustrate a representative process for making heat-reflective fabric of the invention. The web construction shown in FIG. 1 is prepared first, as by vapor-depositing a thin reflective layer 10 on a smooth polymeric film 11; then preferably applying a primer (not shown) over the reflective layer; and then coating the prime layer, if present, or alternatively the reflective layer with a layer of adhesive 12. Some practical materials for the reflective layer are aluminum, copper and alloys of copper; but other metals or electrically conducting materials which reflect substantial portions of incident thermal radiation may also be used.

A base fabric 13 is then laminated to the layer of adhesive 12 by passing the base fabric 13 and the web shown in FIG. 1 between heated pressure rolls. The assembly is heated sufficiently so that the adhesive material 12 softens or liquifies and is absorbed into the fibers 14 of the fabric, which are typically bundles of smaller fibers or filaments. As shown in FIG. 2, a general result of this absorption is that the adhesive layer is thinned between the fibers.

After the laminated assembly has cooled (and in some embodiments, after the adhesive material has advanced to a reacted state), the polymeric film 11 is stripped away, leaving the reflective layer as a smooth mirror-like uncovered layer. The remaining portion of the assembly is then stretched, generally at least about 10 percent, to fracture the adhesive material 12 and reflective layer 10. A network of fractures is formed over the fabric, most fractures occurring at the adhesive-thinned areas between fiber bundles. FIG. 3 is a greatly enlarged sectional view of the stretched fabric, showing fractures 15.

After the stretching force is released, the fabric typically returns to its initial dimensions, but the fractures continue to provide porosity. The fractures may be invisible to the unaided eye but can generally be seen if the fabric is held against a lighted window, especially if the fabric is stretched. FIG. 4 is a top view in which the extensive network of fractures 15 is represented over part of the fabric.

The porosity provided by the fractures in the reflective and adhesive layers can be measured on apparatus 17 as shown in FIG. 5. The apparatus 17 includes an opentopped container 18 almost filled with water 19; an openbottomed plastic bottle 20; and a cap 21 for the bottle, which has a central opening 22. A sample 23 of test fabric is placed inside the bottle cap and the bottle placed on top of the water and allowed to sink. The bottle sinks freely, with the air inside the bottle escaping only through the test fabric. Porosity of the fabric can be determined from a measurement of the time for the bottle to be filled with water, the result being in units of volume per unit of time (the volume of the bottle divided by the measured time) per unit of area (the area of the opening 27 in the cap 21) at a specified unit of pressure (the weight of the bottle divided by the area of the open end of the bottle).

The porosity of fabric of the invention can be tailored for particular uses, as by selecting base fabrics of greater or lesser openness. For use in most heat-stress environments the fabric should have a porosity in the described test of at least 10, and preferably at least 50, cubic centimeters per square centimeter per second at a pressure of one gram per square centimeter pressure. The latter is a very high value, on the order of the porosity of a knit cotton T-shirt. For other uses of fabric of the invention, such as use as an internal liner for cold-weather garments, the porosity can be less, such as 1 or 5 cubic centimeters per square centimeter per second at a pressure of one gram per square centimeter pressure.

The thin reflective layer in fabric of the invention generally has substantially no mechanical rigidity, and the result is that it leaves a base garment fabric to which it is adhered in a drapable condition useful in preparation of comfortable garments. For example, when a 30-centimeter-square sample of a typical garment fabric of the invention is supported by a person's forefinger, it will collapse against the person's fist. By contrast, a preformed self-supporting metal foil has a substantial rigidity, so that when it is laminated to a base fabric (as in the case of the commercial reflective fabric for use in mattresses described above) and the composite supported at a point, the composite will tend to retain its previous shape, with only a gradual declination of the side portions of the fabric from the point where supported. Thinness of the reflective layer also contributes to easy fracturing when the fabric is stretched. To provide properties as described, the reflective layer should generally be less than about one micrometer in thickness, and preferably is less than 1000 angstroms in thickness. Such a layer can conveniently be obtained by conventional processes of vapor-deposition.

To be useful in the manufacturing process represented by FIGS. 1–3, the base fabric 13 should be resiliently stretchable at least 10 percent, and preferably at least 20 percent, without tearing. Knit fabric has been found especially useful. Either synthetic or natural fibers may be used, with cotton, polyester, and rayon fibers being preferred. The fabric is desirably a rather open fabric, such as a jersey knit, typically having a porosity in the described test on the order of 60–80 cubic centimeters/square centimeter/second at one gram/square centimeter pressure.

The adhesive material of the layer 12 in FIGS. 1–3 is preferably a reactive or crosslinkable material so that, after reaction, it contributes to dimensional stability and planarity of the reflector surfaces, both in subsequent processing of fabric of the invention and in use of the fabric (including wearing, exposure to heated environments, washing, ironing, etc). The adhesive material is also preferably elastomeric to contribute to drapability and wearability of the fabric. ("Elastomeric" is used herein to describe materials that can be stretched at room temperature to at least twice their original length, and after having been stretched and the stress removed, return with force to approximately their original length in a short time.) But for use in the manufacturing process as described, the adhesive material should also initially soften and flow upon heating so that the adhesive material penetrates into the fibers of the base fabric.

Particularly useful adhesive materials include epoxy-terminated ingredients, because of the good adhesive qualities provided by such materials, and because they may be cured to a heat-resistant and solvent-resistant state. A useful coreactive ingredient to include with epoxy-terminated ingredients is water-insoluble polyether polyamines having a high amine functionality such as taught in U.S. Pat. Nos. 3,436,359 and 3,824,197, which are incorporated herein by reference. Compositions including such polyamines may be cured to a flexible elastomeric state. Because of the high amine functionality, the components can be integrated into a cross-linked network at substantially all the terminal sites on the components, with the result that tough elastomeric adherent properties are exhibited by cured layers of the composition. Other useful adhesive materials include neoprenes, chlorosulfonated polyethylenes, and both reactive and thermoplastic polyurethanes.

The invention will be further illustrated by the following example. In this example the polymeric film 11 shown in FIG. 1 was a 2-mil-thick (50-micrometer) film of cellulose acetate. Aluminum was vapor-deposited onto this film in a thickness of about 200 angstroms. The aluminum layer was then primed to improve its adhesion to the adhesive layer by coating a solution comprising an isocyanate ("Hylene M-50" supplied by duPont) and chlorinated rubber ("Parlon" supplied by duPont) in toluene solvent onto the aluminum layer and drying the coating.

The adhesive layer 12 was prepared from the following ingredients.

TABLE I

| Test No. | Relative Humidity (%) | Wall Temperature (°F) | (°C) | WBGT inside environmental chamber (°F) | (°C) | Temperature Inside Text Fixture Samples | | | | | | | |
|---|---|---|---|---|---|---|---|---|---|---|---|---|---|
| | | | | | | A | | B | | C | | D | |
| | | | | | | (°F) | (°C) | (°F) | (°C) | (°F) | (°C) | (°F) | (°C) |
| 1 | 20 | 123 | 50 | 78.3 | 25.8 | 71.2 | 21.8 | 76.1 | 24.5 | 89.1 | 31.8 | 74.2 | 23.4 |
| 2 | 20 | 153 | 66 | 82.5 | 28.0 | 71.5 | 22.0 | 80.4 | 26.9 | 88.8 | 31.6 | 78.1 | 25.6 |
| 3 | 50 | 123 | 50 | 86.7 | 30.4 | 83.1 | 28.3 | 85.5 | 29.7 | 90.9 | 32.7 | 85.6 | 29.8 |
| 4 | 50 | 153 | 66 | 91.7 | 33.2 | 84.5 | 29.2 | 87.6 | 30.9 | 91.7 | 33.1 | 89.4 | 31.9 |
| 5 | 80 | 123 | 50 | 94.8 | 34.8 | 91.1 | 32.8 | 93.1 | 34.0 | 93.4 | 34.1 | 93.9 | 34.3 |
| 6 | 80 | 153 | 66 | 99.4 | 37.4 | 93.1 | 34.0 | 97.4 | 36.3 | 93.4 | 34.1 | 97.4 | 36.3 |

| | Parts by Weight |
|---|---|
| Polytetramethylene oxide diamine having an average molecular weight of about 10,000 | 27.0 |
| 2,4,6-tris(n,N-dimethyl aminomethyl) phenol | 1.2 |
| Diglycidyl ether of bisphenol A (epoxy equivalent weight 180–200) | 13.7 |
| N-(2-aminoethyl)-3-amino propyl trimethoxy silane | 1.0 |
| Diphenyl-4,4'-methylene dicarbanilate | 1.0 |
| Epoxidized soybean oil (Paraplex G-62; supplied by Rohm and Haas) | 5.8 |
| Xylene | 10.9 |
| Titanium dioxide white pigment | 13.0 |
| Toluene | 26.4 |

This solution was coated over the primed aluminum layer in a 4-mil-thickness (100-micrometer) and then allowed to dry at a low temperature (75°–100° F; 24°–38° C) for 2 to 5 minutes. Thereupon a 100-percent cotton jersey knit fabric weighing 5 ounces per square yard (17 milligrams/square centimeter) was laid against the adhesive layer and the assembly passed through pressure rolls heated to 240° F (115° C). The assembly was contacted by the heated rolls for several seconds, after which the assembly was removed from the rollers and the adhesive material allowed to cure further either at room temperature or briefly at 300° F. The cellulose acetate film was stripped away and the fabric stretched transversely 20 to 30 percent by tentering to fracture the aluminum and adhesive layers.

Figure 6:
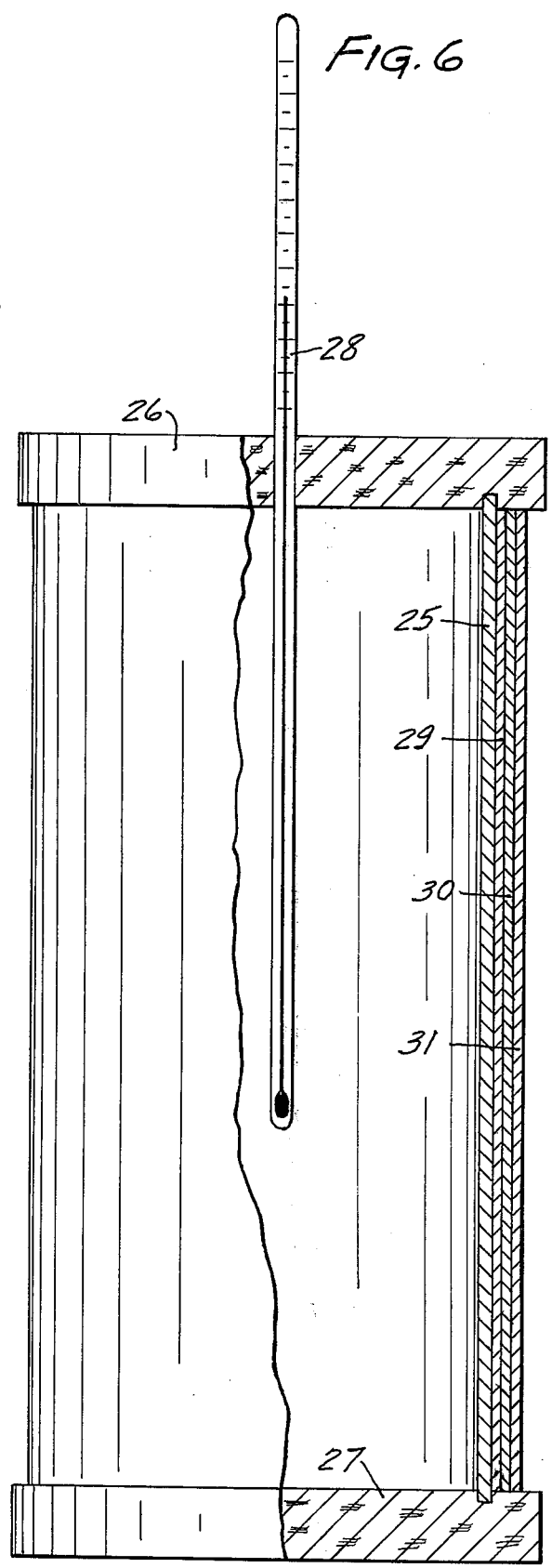
FIG. 6 is a cross-sectional view of apparatus for comparing the relative ability of fabrics to relieve heat stress.

A series of tests was conducted comparing fabric as prepared in this example (Sample A in Table I below) with other types of fabric — a white knit cotton T-shirt (Sample B), a commercial heat-reflective fabric carrying a continuous vapor-deposited exterior metal film (Sample C), and a washed lightweight blue cotton denim (Sample D) — as to ability to cool a person in an environment having a source of moderate-to-high-temperature radiation. In these tests a sample of fabric of the example and a comparative fabric were tested on test fixtures placed side-by-side in an environment chamber. The test fixture, which is illustrated in FIG. 6 and is intended to simulate a sweating person, consisted of a cylinder 25 of aluminum having a wall thickness of about 4 mils (100 micrometers), a diameter of 2.5 inches (6.25 centimeters) and a length of 6 inches (15 centimeters). The cylinder was insulated at each end with cork discs 26 and 27, and a thermometer 28 was inserted through an opening in the disc at one end and along the central longitudinal axis of the cylinder. A double layer of black cotton knit fabric 29 was wrapped around the cylinder 25 and held in place with a nylon mesh 30. The layers of black fabric were soaked with water and allowed to drain briefly, and then the whole cylinder was covered with the test fabric 31. The assembly was allowed to sit in the test environment for at least 20 minutes until an equilibrium temperature had been reached. This equilibrium temperature integrated into a single number the combined effect of: air temperature, relative humidity of the environment, velocity of air in the environment, and radiation temperature.

The conditions in the environment chamber were varied to produce different combinations of conditions. Relative humidity was set at 20%, 50%, and 80%, air velocity was set at 100 feet per minute (30 meters per second); ambient air temperature was set at 95° F (35° C); and wall temperature was set at 123° F (50° C) and 153° F (66° C).

Results are given in Table I.

Tests comparing fabric of this example with a variety of other fabrics were also conducted with test fixtures as shown in FIG. 6 placed side-by-side in an outdoor environment. In these tests the ambient temperature was 83°–91° F (28°–33° C), relative humidity was 35–45%, air velocity was 5 to 10 miles per hour (130 to 260 meters per second), and the sky was mostly sunny. Four different series were run on different days using different fabrics. The results, given in Table II offer a comparison of the fabrics tested in a particular series.

TABLE II

| Fabric Type | Temperature inside test cylinder | |
|---|---|---|
| | (°F) | (°C) |
| Series 1 | | |
| White knit | 74 | 23.3 |
| Black knit | 80.6 | 27.0 |
| Fabric of the invention | 73 | 22.8 |
| Series 2 | | |
| White knit | 78.8 | 26.0 |
| Black knit | 80 | 26.7 |
| Grey strip pinwale | 77.5 | 25.3 |
| Fabric of the invention | 75.5 | 24.2 |
| Series 3 | | |
| White knit | 83 | 28.3 |
| Black knit | 89.6 | 32.0 |
| Fabric of the invention | 79.5 | 26.4 |
| Series 4 | | |
| Fabric of the invention | 75 | 23.9 |
| Brown corduroy | 79.6 | 36.0 |
| Commercial fabric carrying continuous vapor-deposited layer of aluminum | 96.8 | 26.5 |

Tests were also conducted using the described test fixtures and environmental chamber with the chamber set to provide conditions which represent a typical factory heat-stress environment, namely, a relative humidity of 20 percent, an ambient air temperature of 95° F (35° C), an air velocity of 400 feet per minute (120 meters per second), and a wall temperature of 200° F (93° C). Six runs were made on five different fabrics as listed in Table III as follows:

TABLE III

|  | Average of 6 runs of temperature inside test cylinder | |
| --- | --- | --- |
|  | (° F) | (° C) |
| Commercial fabric carrying a continuous layer of vapor-deposited aluminum | 88.6 | 31.5 |
| White cotton knit | 84.6 | 29.2 |
| Fabric of the invention | 78.9 | 26.0 |
| Blue denim | 86.3 | 30.2 |
| Grey pinwale | 85.5 | 29.7 |

In a different series of tests, the porosity of a fabric of this example was compared with other fabrics as listed in Table IV. Porosity was measured on a test apparatus as shown in FIG. 5, and results are listed in Table IV.

TABLE IV

|  | Porosity (cc/cm²/ Sec at one gm/cm²) |
| --- | --- |
| Knit open-mesh high wet modulus rayon | 333. |
| Lightweight synthetic knit (4 oz./sq. yd.) | 250. |
| Lightweight synthetic jersey knit (5 oz./sq. yd.) | 167.0 |
| Summer-weight, woven wool fabric | 111.1 |
| Double knit men's suit fabric | 83.7 |
| Tube-knit cotton (T-shirt; 5 oz./sq. yd.) | 77.0 |
| Fabric of the invention | 67.0 |
| Rib-knit cotton/polyester blend | 62.5 |
| Cotton/polyester woven cloth for men's shirts | 26.9 |
| Cotton corduroy | 19.1 |
| Cotton polyester denim (8 oz./sq. yd.) | 17.8 |
| Nylon woven windbreaker | 15.0 |
| Seersucker | 14.5 |
| Commercial metallized mattress liner | 6.0 |
| Commercial fabric having a continuous layer of vapor-deposited aluminum | 0.0 |

What is claimed is:

1. A porous reflective fabric comprising a resiliently stretchable base fabric and an originally continuous vapor-deposited reflective layer less than about one micrometer thick adhered to the base fabric by a layer of adhesive material and leaving the base fabric with sufficient drapability that a sample supported by a person's forefinger will collapse around his fist; said reflective and adhesive layers having an extensive network of minute fractures communicating with interstices in the base fabric whereby said reflective fabric has a porosity sufficient for extended comfortable wearing of a garment that incorporates the fabric.

2. Reflective fabric of claim 1 in which the base fabric is a knit fabric that is resiliently stretchable at least 10 percent without tearing.

3. Reflective fabric of claim 1 in which the reflective layer comprises vapor-deposited aluminum.

4. Reflective fabric of claim 1 in which the layer of adhesive material is elastomeric.

5. A porous reflective fabric comprising a base knit fabric that is resiliently stretchable at least 10 percent without tearing; a layer of elastomeric adhesive material adhered to one side of the base fabric; and a thin originally continuous vapor-deposited reflective layer adhered to the base fabric by said adhesive layer; said reflective and adhesive layers having an extensive network of minute fractures communicating with interstices in the base fabric, whereby the reflective fabric has a porosity sufficient for extended comfortable wearing of a garment made from the fabric.

6. Reflective fabric of claim 5 in which said reflective layer comprises vapor-deposited aluminum.

7. Reflective fabric of claim 5 in which said reflective layer comprises copper or an alloy of copper.

8. Reflective fabric of claim 5 in which said reflective layer comprises a layer that includes selenium.

9. Reflective fabric of claim 5 in which said adhesive material comprises an epoxy resin and a water-insoluble polyether-polyamine of high amine functionality.

10. Reflective fabric of claim 5 having a porosity of at least about 50 cubic centimeters per square centimeter per second at one gram per square centimeter in the test described herein.

11. A process for preparing a porous reflective fabric comprising:
   1. applying a layer of adhesive material onto a thin smooth continuous vapor-deposited reflective layer that is carried on a smooth flexible web;
   2. laminating to the adhesive layer a base fabric that is resiliently stretchable at least 10 percent without tearing;
   3. removing the smooth flexible web from the reflective layer; and
   4. stretching the resulting sheet material so as to form an extensive network of minute fractures in the reflective and adhesive layers that communicate with interstices of the fabric.

12. A reflective fabric of claim 1 which has a porosity in the test described herein of at least 10 cubic centimeter/sq. centimeter/second at 1 gram/sq. centimeter pressure.

13. A reflective fabric of claim 5 which has a porosity in the test as described herein of at least 10 cubic centimeter/sq. centimeter/second at 1 gram/sq. centimeter pressure.

14. Reflective fabric of claim 1 which has a porosity in the test described herein of at least 50 cubic centimeters/square centimeter/second at one gram/square centimeter pressure.

* * * * *